United States Patent Office 3,119,835
Patented Jan. 28, 1964

3,119,835
CONDITIONING OF PHTHALOCYANINE
PIGMENTS
Harold N. Schmidt, Toms River, N.J., assignor to General Aniline & Film Corporation, New York, N.Y., a corporation of Delaware
No Drawing. Filed Feb. 20, 1962, Ser. No. 174,398
6 Claims. (Cl. 260—314.5)

The present invention relates to the preparation of improved phthalocyanine pigments and more particularly to an improved process for providing metal phthalocyanines and chlorinated derivatives thereof in finely divided physical form characterized by a greenish hue, high tinctorial strength and stability in aromatic solvents.

Tinting strength is an important factor in phthalocyanine pigments and it is generally dependent upon the particle size of the phthalocyanine. It is generally recognized that tinting strength increases as the size of the pigment crystal decreases, thereby exposing more surface area. Ordinarily, crude phthalocyanine particles possess such a large particle size that unduly large amounts are required to perform a satisfactory coloring function. In order for a pigment to have commercial utility, the crude particles must be reduced in particle size to about one micron or less.

Heretofore, a variety of means have been suggested for accomplishing this result. One of the means heretofore employed involved the formation and simultaneous solution of copper phthalocyanine sulfate in strong sulfuric acid. After the crystal has been thus destroyed, the blue phthalocyanine pigment is recovered in a finely divided pigmentary form by drowning the sulfuric acid solution of the phthalocyanine sulfate in a large excess of water. The phthalocyanine sulfate is instantly hydrolyzed leaving the free phthalocyanine in the desired finely divided form which is then recovered as by filtration, washed and dried. While the aforementioned process provides a blue pigment suitable for many purposes, it has been found to be of a reddish hue and to be amenable to recrystallization particularly in the presence of aromatic liquids. This aspect is extremely undesirable when application is attempted in coating systems such as paints and some plastics where aromatic solvents are employed. Another popular and practical method of producing a crystallization resistant pigment particle of a greener hue involves the subjection of the coarse, crude phthalocyanine particles to particle size reduction via attrition by milling in the presence of finely ground common salt with an inert liquid to provide a heavy milling mass. When a satisfactory finely divided form has been attained, the milled mass is drowned in a large volume of water so that the salt and solvents can be eliminated, thus facilitating recovery of the pigment particles.

The present invention is based on the discovery that a phthalocyanine pigment characterized by a greenish hue, high tinctorial strength and stability in aromatic solvents is produced by milling or grinding a crude phthalocyanine with finely divided sodium chloride in the presence of hydrochloric acid gas or an acid which forms hydrochloric acid through action with the sodium chloride, and subsequently recovering the pigment thus produced.

While not wishing to be bound by any particular theory or mechanism or reaction, it is believed that the surprising results achieved by the process of the invention are due in part to conjoint utilization of the chemical disintegration powers of strong acids and physical attrition powers of finely divided salt as grinding aids to effect particle size reduction. Apparently, the use of small amounts of acids in conjunction with the salt causes the formation of anhydrous hydrochloric acid, by interaction therewith, which subsequently attacks the large phthalocyanine particles and fractures them by apparently forming the hydrochloride of the phthalocyanine particle. Subsequent heating thereof effectively destroys the hydrochloride leaving the phthalocyanine particle suspended in sodium chloride in finely divided form.

The method of this invention is operative for conditioning of any phthalocyanine compound produced in any desired manner, such as metal-free phthalocyanine, metal phthalocyanines including copper, nickel, cobalt, zinc and lead phthalocyanines, halogenated metal and metal-free phthalocyanines such as copper monochlorophthalocyanine, copper octachlorophthalocyanine, copper hexachlorophthalocyanine and chlorophthalocyanine. The phthalocyanine molecule can also be nuclearly substituted with radicals such as nitro, amino, thio, oxy, carbonyl, alkoxy, aryl, aryloxy and the like.

The amount of finely divided sodium chloride which is employed is not necessarily a critical feature of the invention. It has been discovered that as little as 2.5 to 4.0 parts of salt per part of phthalocyanine is sufficient to provide highly desirable results.

The acid which is employed in conjunction with the sodium chloride can be anhydrous hydrochloric acid or any acid sufficiently strong to combine with the sodium chloride to produce hydrochloric acid under the milling conditions. Acids which have been found operative in this respect include sulfuric acid and other strong, normally liquid, non-oxidizing acids such as chloracetic, phosphoric, chlorosulfonic and aromatic alkylsulfonic acids such as methyl sulfonic acid, ethyl sulfonic acid, benzene sulfonic acid, toluene sulfonic acid and the like.

The amount of acid which is employed in accordance with the invention is not critical except that the amount of acid employed should be small, i.e., from one fourth to one mole equivalent of the phthalocyanine present and preferably from 0.5 to 0.7 mole of acid per mole of phthalocyanine.

The temperature at which acid-salt milling procedure of the invention can be carried out is not narrowly critical and can vary over a considerable range, i.e., from 30° C. to 110° C. It is preferred, however, for reasons of economy, to operate at a temperature in the range of from about 40° C. to about 60° C.

In carrying out the milling procedure of the invention, it may be desirable to employ an inert solvent along with the acid and sodium chloride. Typical inert solvents which find utility in the process of the invention include ethylene glycol, diethylene glycol, glycerine, propanol and furfuraldehyde. Acetone and ethyl acetate can also be used but are less preferred due to their volatility. Preferred solvents are those which are water-soluble to facilitate their removal from the product and liquids with a high viscosity and high boiling point are preferred.

The particular apparatus used for effecting the milling can be any of the conventional types of milling apparatus used in the art. While it is preferred to use a Werner- Pfleiderer type of mill, a Banbury mixer, a ball mill or a rod mill can be employed with equal facility.

One of the remarkable features of the invention is that milling times necessary to achieve conditioning of the pigment are effectively shortened. It is thus now possible to accomplish desirable results in from two to four hours instead of the ten hours heretofore required by other processes. It is preferably to use a short milling time since it is possible to achieve relatively high productivity with relatively small equipment.

The following examples will serve to illustrate the practice of the invention, it being understood that the invention is not restricted thereto. The parts are by weight unless otherwise stated.

*Example 1*

Into a Werner-Pfleiderer mixer of 75 gallons working capacity were charged 60 pounds of ethylene glycol followed, as mixing continued, by 100 pounds of crude chlorine-free phthalocyanine and 200 pounds of hammer-milled salt that was ground through a 0.020″ slotted screen. When the mixing mass reached a uniform, pasty condition, 20 pounds of anhydrous toluene sulfonic acid were added, followed by an additional 100 pounds of salt. The temperature was raised to 60° C. and milling was continued for four hours after which the contents of the mixer were discharged into 2,000 volume pounds of water. After sufficient digestion time to dissolve away the salt, the water slurry was filtered and the resultant pigment cake washed chloride-free.

Drying this cake and dispersing the thus obtained pigment in an oleoresinous system showed it to possess tinctorial properties fully equivalent to any similar commercial product.

*Example 2*

Into a running Werner-Pfleiderer type apparatus of one pint working capacity were charged 55 grams of ethylene glycol, 75 grams of chlorine-free copper phthalocyanine and 225 grams of the same salt used in Example 1. The mixer was heated to 60° C. and 13.0 grams of 100 percent $H_2SO_4$ were added at a uniform rate over 30 minutes. Mixing was then continued for five hours at 50 to 60° C. Samples taken from the mixer after one hour's mixing after the acid was all in, showed the milling was essentially complete at this time as this sample showed the tinting strength and greenish hue characteristic of commercial beta type copper phthalocyanine. A sample taken after three hours mixing demonstrated a slight gain in tinting strength, making it slightly superior to the aforesaid commercially acceptable pigment. The five hour mixing sample showed no further improvement.

*Example 3*

50 grams of essentially chlorine-free copper phthalocyanine in the large crude crystal form were added to a one quart pebble mill along with two hundred grams of dry sodium chloride and 500 grams of ½″ pebbles. The air in the mill was displaced by dry hydrochloric acid gas, and the pebble mill was closed. Milling was done for two hours after which the mill was opened and the atmosphere contained therein was recharged with dry hydrochloric acid gas. The mill was then again closed and milling continued for four more hours. After this time, the mill was opened, flushed with dry air and milling continued for an additional four hours. After this time, the mill was dumped and the pebbles were separated from the salt-phthalocyanine mixture. This salt mass was then drowned into two liters of cold water to dissolve away the salt. Isolation of the blue pigment from this mixture provided a copper phthalocyanine pigment of the beta modification essentially equal in shade and tinctorial properties to its commercial counter-parts.

*Example 4*

The process of Example 1 was repeated except that a crude copper phthalocyanine having been chlorinated to the extent of 1.6 percent of its total mass was substituted for chlorine-free copper phthalocyanine. The result was a pigment similar in most respects to that produced by Example 1, but with the added feature of demonstrating a higher degree of pigmented film transparency and depth of masstone.

*Example 5*

The process of Example 2 was repeated in its entirety except that 12.0 grams of NaOH flakes were added to the mixer after the five hours milling time was up. The resultant mass was then treated as was that of Example 2. This produced a pigment fully equal to that of Example 2.

What is claimed is:

1. The process for producing phthalocyanine pigment in a finely divided physical form characterized as a greenish hue and tinctorial stability in aromatic solvents which comprises milling at a temperature of from 30° C. to 110° C. a mass of a crude phthalocyanine pigment with at least 2.5 parts sodium chloride per part of said phthalocyanine pigment in the presence of from one-fourth to one mole equivalent of said phthalocyanine pigment of anhydrous acids selected from the group consisting of hydrochloric acid and acids capable of generating hydrochloric acid with sodium chloride and subsequently removing the hydrochloric acid from the milled mass.

2. The process of claim 1 followed by discharging the milled mass into water.

3. The process of claim 1 wherein the acid is sulfuric acid.

4. The process of claim 1 wherein the acid is toluene sulfonic acid.

5. The process of claim 1 wherein the crude phthalocyanine is chlorine-free copper phthalocyanine.

6. The process of claim 1 wherein the crude phthalocyanine is a chlorinated copper phthalocyanine.

References Cited in the file of this patent

UNITED STATES PATENTS

| | | |
|---|---|---|
| 2,765,319 | Barnhart | Oct. 2, 1956 |
| 2,840,568 | Brouillard et al. | June 24, 1958 |

OTHER REFERENCES

Fieser et al.: Organic Chemistry, Reinhold, N.Y., 3rd ed. (1956), page 588.